July 31, 1962 P. D. MYERS 3,046,827
TWIST LOCK PIN WITH BALL DETENTS AND A RECTANGULAR ACTUATOR
Filed June 15, 1959
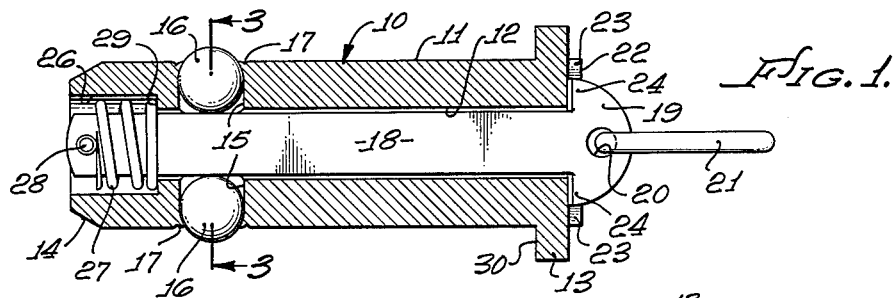
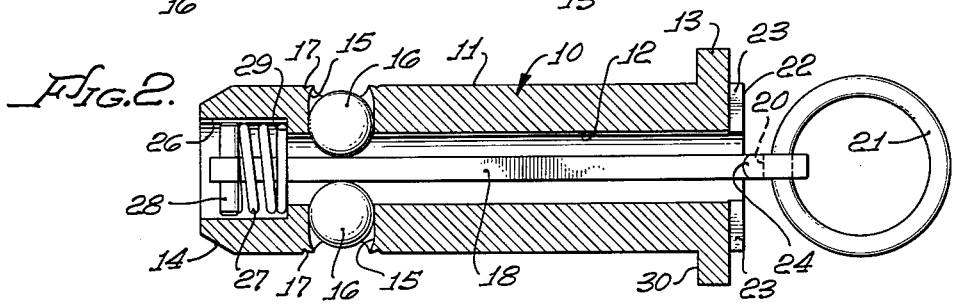
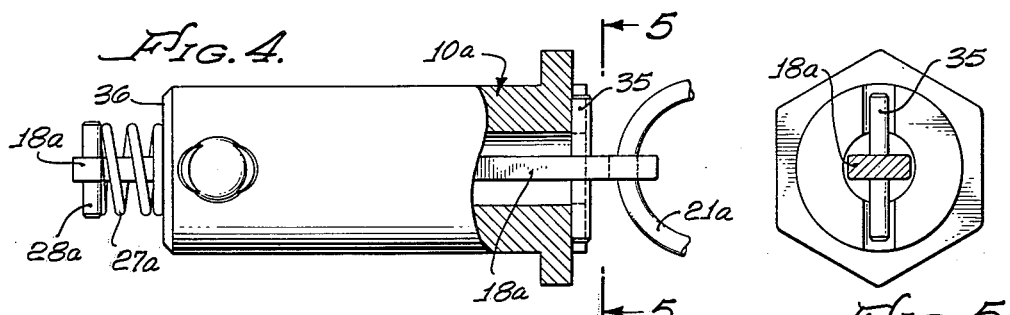
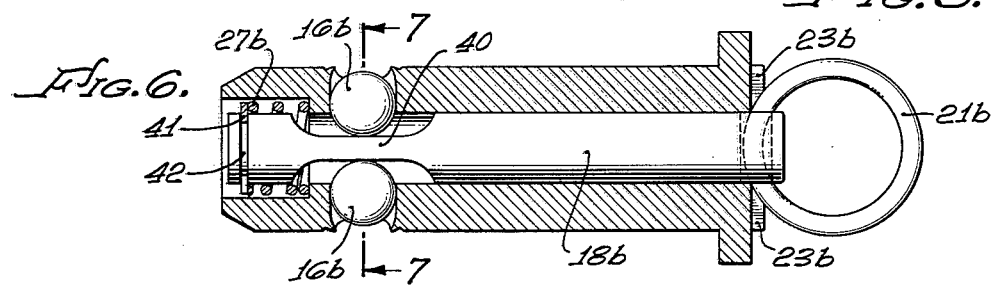
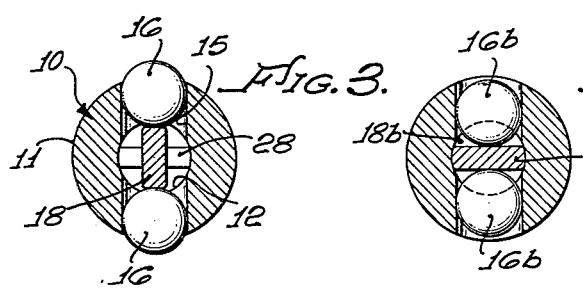
INVENTOR.
PAUL D. MYERS
BY
Lyon & Lyon
ATTORNEYS.

United States Patent Office 3,046,827
Patented July 31, 1962

3,046,827
TWIST LOCK PIN WITH BALL DETENTS AND A RECTANGULAR ACTUATOR
Paul D. Myers, La Canada, Calif., assignor to Aerpat Aktien Gesellschaft, Glarus, Switzerland, a corporation of Switzerland
Filed June 15, 1959, Ser. No. 820,318
1 Claim. (Cl. 85—5)

This invention relates to releasable connecting devices of the general type employing locking ball elements which may be projected laterally beyond the outer surface of a hollow shank. A device of this general type is shown in the Spooner Patent 2,352,414. Heretofore such releasable fasteners have employed an axially moving plunger within the hollow shank for controlling the action of the locking ball elements. Such devices are relatively expensive to manufacture even on a quantity production basis. Moreover, the weight of devices constructed in this fashion is considerable and this may be a serious disadvantage when the devices are used in aircraft or missiles. Moreover, the overall length of such devices is sometimes so great as to constitute another serious disadvantage.

In accordance with my invention, I provide a twist lock pin fastener having a rotary actuator instead of an axially movable plunger for actuating the locking ball. Commercial forms of this invention provide economies of manufacture on a mass production basis. Furthermore, important reductions in weight are achieved and the lengths of certain components are reduced so that the overall length is minimized. Other related objects and advantages will appear hereinafter.

In the drawings:

FIGURE 1 is a longitudinal sectional elevation showing a preferred embodiment of my invention, the locking balls being shown in operative position.

FIGURE 2 is a sectional view similar to FIGURE 1 showing the actuator turned one-quarter revolution and showing the locking balls in retracted position.

FIGURE 3 is a transverse sectional view taken substantially on the lines 3—3 as shown in FIGURE 1.

FIGURE 4 is a side elevation partly in section showing a modified form of my invention.

FIGURE 5 is an end view of the device shown in FIGURE 4 taken substantially on the lines 5—5 as shown in FIGURE 4.

FIGURE 6 is a longitudinal sectional elevation showing another modification.

FIGURE 7 is a transverse sectional view taken substantially on the lines 7—7 as shown in FIGURE 6.

Referring to the drawings, the hollow shank 10 is provided with a cylindrical outer surface 11 and a concentric cylindrical bore 12. A polygonal flange 13 is provided at one end of the cylindrical surface 11 and the other end may be chamfered as shown at 14. A pair of aligned radially extending apertures 15 are provided in the shank 10 and these apertures communicate with the central cylindrical bore 12. A ball 16 is mounted in each of the apertures 15 and is retained against escape from the apertures by means of staking 17 which reduces the size of the outlet opening of the aperture.

An actuator 18 of generally rectangular cross section is mounted to turn within the central bore 12 of the shank 10. The actuator 18 engages the balls 16 and in the position shown in FIGURE 1 the balls are projected outwardly to extend beyond the outer surface 11 of the shank 10. When the actuator 18 is turned at right angles relative to the shank 10 (as shown in FIGURE 2) the balls 16 are permitted to move inwardly to a retracted position in which they no longer project beyond the surface 11 of the shank 10.

The actuator 18 is provided with a head 19 which projects exteriorly of the shank 10 and is provided with an opening 20 which loosely receives a manually graspable ring 21. A projection 22 on the shank 10 is provided with a transverse slot 23 which receives the laterally projecting portions 24 of the head 19.

The shank 10 is also provided with a coaxial counterbore 26 remote from the flange 13. A coil spring 27 is positioned within the counter bore 26 and encircles a portion of the actuator 18. At one end the spring 27 bears against the abutment pin 28 fixed on the actuator 18 and at the other end the spring bears against the shoulder 29 at the end of the counterbore 26.

In operation, the parts are placed in the position shown in FIGURE 2 and the shank 10 is inserted into aligned openings in adjacent work pieces (not shown). One of the work pieces engages the flange shoulder 30. The actuator 18 is then manually turned by means of the ring 21 so that the rounded nose portion 24 on the head 19 drops into the slot 23. This turning action of the actuator 18 relative to the shank 10 causes the actuator to project the ball 16 outward as shown in FIGURE 1, thereby providing outward extending projections to retain the work members between the shoulder 30 and the ball 16. The spring 27 acts resiliently to prevent the gears 24 from moving out of the slot 23. When it is desired to remove the shank from the work members, the ring 21 is grasped and the actuator 18 is turned to the position shown in FIGURE 2. Tension applied to the ring then acts through the actuator and spring 27 to withdraw the shank 10 from the work members.

The modified form of my invention shown in FIGURES 4 and 5 is similar to that previously described except that the rectangular actuator 18a has a cross pin 35 instead of a head 19 and ears 24. Also the spring 27a, abutment pin 28a and a portion of the actuator 18a project beyond the end 36 of the shank 10a, instead of being mounted in a counterbore. The spring 27a bears against the end 36 of the shank 10a. The operation is the same as that previously described.

The construction and operation of the second modification shown in FIGURES 6 and 7 is the same as that previously described except that the actuator 18b is cylindrical for the major portion of its length and has only a relatively short portion 40 which is generally rectangular in cross section and which contacts the balls 16b. The ring 21b engages directly in the slots 23b and the actuator head is omitted. Also a split retainer 41 is provided in a groove 42 on the actuator 18b for engagement with one end of the spring 27b.

It will be understood that the head 19 and its ears 24 may be used if desired with the forms of my invention shown in FIGURE 4 or FIGURE 6 and that conversely the device of FIGURES 1 and 2 may be provided with the cross pin 35 or the ring which enters the slot 23, instead of the head 19.

Having fully described my invention, it is to be understood that I do not wish to be limited to the details herein set forth but my invention is of the full scope of the appended claim.

I claim:

In a releasable fastener device the combination of: a tubular shank having a cylindrical bore and a coaxial counterbore and having side apertures communicating with the said bore, an elongated actuator of generally rectangular cross section throughout its length mounted to turn within the cylindrical bore, balls mounted in said apertures and in contact with said actuator, said actuator in one angular position relative to the shank acting to project the balls outward through the side apertures and in another angular position permitting the balls to move radially inward to a retracted position, the actuator having a laterally extending integral head projecting exteriorly of the shank, said head being substantially flat and coplanar with said actuator and having transversely extending and axially facing edge portions engageable with a groove-defining element on an end of the shank remote from the counterbore to maintain the actuator in the first said angular position, a cross pin fixed to the actuator and positioned within said counterbore, and a coil spring in the counterbore encircling a portion of the actuator and acting against the cross pin to hold the head in engagement with said groove-defining element on the shank, and handle means on said actuator adjacent said head for manually moving said actuator against the actions of said spring to disengage said axially facing edge from said groove-defining element and for turning said actuator in said bore.

References Cited in the file of this patent
UNITED STATES PATENTS

| | | |
|---|---|---|
| 1,921,225 | Hawkins | Aug. 8, 1933 |
| 2,402,925 | Spooner | June 25, 1946 |

FOREIGN PATENTS

| | | |
|---|---|---|
| 413,403 | Great Britain | July 19, 1934 |
| 54,989 | France | Dec. 6, 1950 |